(12) United States Patent
Sesti et al.

(10) Patent No.: US 10,399,510 B2
(45) Date of Patent: Sep. 3, 2019

(54) METHOD OF MANUFACTURING VEHICULAR CAMERA WITH FLEXIBLE CONNECTORS

(71) Applicant: MAGNA ELECTRONICS INC., Auburn Hills, MI (US)

(72) Inventors: Matthew C. Sesti, Williamston, MI (US); Steven V. Byrne, Goodrich, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/871,174

(22) Filed: Jan. 15, 2018

(65) Prior Publication Data

US 2018/0148001 A1   May 31, 2018

Related U.S. Application Data

(63) Continuation of application No. 14/992,254, filed on Jan. 11, 2016, now Pat. No. 9,868,404, which is a
(Continued)

(51) Int. Cl.
*B60R 11/04* (2006.01)
*H01R 12/91* (2011.01)
(Continued)

(52) U.S. Cl.
CPC .............. *B60R 11/04* (2013.01); *B60Q 9/008* (2013.01); *H01R 12/91* (2013.01);
(Continued)

(58) Field of Classification Search
CPC ...... B60R 11/04; H04N 5/2252; B60Q 9/008; H01R 12/91; H01R 12/716; H01R 13/112
(Continued)

(56) References Cited

U.S. PATENT DOCUMENTS 4,641,901 A    2/1987  Brennan
5,550,677 A    8/1996  Schofield et al.
(Continued)

OTHER PUBLICATIONS

International Search Report and Written Opinion dated Jun. 19, 2012 from corresponding PCT application No. PCT/US2012/026073.

*Primary Examiner* — Yogesh K Aggarwal
(74) *Attorney, Agent, or Firm* — Honigman LLP

(57) ABSTRACT

A method of assembling a camera for mounting at a vehicle for a vehicle vision system includes providing front and rear housings and providing a set of first electrical connectors at a circuit board of the front housing and providing a set of second electrical connectors at the rear housing. One of the first and second electrical connectors includes male connectors and the other of the first and second electrical connectors includes female connectors. The rear housing is mated with the front housing to encase an imaging element and the circuit board. When mating the rear housing with the front housing, the male connectors are inserted into respective female connectors to electrically conductively connect the first and second electrical connectors. When inserting the male connectors into the respective female connectors, the female connectors flex to accommodate misalignment of the male and female connectors.

19 Claims, 9 Drawing Sheets

Related U.S. Application Data continuation of application No. 14/001,272, filed as application No. PCT/US2012/026073 on Feb. 22, 2012, now Pat. No. 9,233,641.

(60) Provisional application No. 61/593,962, filed on Feb. 2, 2012, provisional application No. 61/446,975, filed on Feb. 25, 2011.

(51) Int. Cl.
*B60Q 9/00* (2006.01)
*H04N 5/225* (2006.01)
*H01R 12/71* (2011.01)
*H01R 13/11* (2006.01)

(52) U.S. Cl.
CPC ......... *H04N 5/2252* (2013.01); *H01R 12/716* (2013.01); *H01R 13/112* (2013.01)

(58) Field of Classification Search
USPC .................................................. 348/370–376
See application file for complete search history.

(56) References Cited

U.S. PATENT DOCUMENTS

| | | |
|---|---|---|
| 5,670,935 A | 9/1997 | Schofield et al. |
| 5,803,758 A | 9/1998 | Kameyama |
| 5,853,300 A * | 12/1998 | Robinson ............... G01R 11/04 439/517 |
| 5,949,331 A | 9/1999 | Schofield et al. |
| 6,089,903 A | 7/2000 | Gray et al. |
| 6,222,447 B1 | 4/2001 | Schofield et al. |
| 6,498,620 B2 | 12/2002 | Schofield et al. |
| 6,605,775 B1 | 8/2003 | Seeber et al. |
| 6,611,202 B2 | 8/2003 | Schofield et al. |
| 6,636,258 B2 | 10/2003 | Strumolo et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,381,089 B2 | 6/2008 | Hosler, Sr. |
| 7,492,262 B2 | 2/2009 | Washington |
| 7,592,928 B2 | 9/2009 | Chinomi et al. |
| 7,859,565 B2 | 12/2010 | Schofield et al. |
| 8,194,132 B2 | 6/2012 | Dayan et al. |
| 8,866,907 B2 | 10/2014 | McElroy et al. |
| 9,041,806 B2 | 5/2015 | Baur et al. |
| 9,233,641 B2 | 1/2016 | Sesti et al. |
| 9,868,404 B2 | 1/2018 | Sesti et al. |
| 2006/0171704 A1* | 8/2006 | Bingle ................... B60R 11/04 396/419 |
| 2006/0212624 A1 | 9/2006 | Kim |
| 2006/0254805 A1 | 11/2006 | Scherer et al. |
| 2009/0244361 A1 | 10/2009 | Gebauer et al. |
| 2010/0097519 A1 | 4/2010 | Byrne et al. |
| 2010/0118145 A1 | 5/2010 | Betham et al. |
| 2011/0310248 A1 | 12/2011 | McElroy et al. |
| 2012/0062743 A1 | 3/2012 | Lynam et al. |
| 2012/0154591 A1 | 6/2012 | Baur et al. |
| 2013/0242099 A1 | 9/2013 | Sauer et al. |
| 2013/0314503 A1 | 11/2013 | Nix |
| 2013/0328672 A1 | 12/2013 | Sesti et al. |
| 2014/0022390 A1 | 1/2014 | Blank et al. |
| 2014/0138140 A1 | 5/2014 | Sigle |
| 2014/0152778 A1 | 6/2014 | Ihlenburg |
| 2014/0218535 A1 | 8/2014 | Ihlenburg |
| 2014/0247355 A1 | 9/2014 | Ihlenburg |
| 2014/0313339 A1 | 10/2014 | Diessner |
| 2014/0340510 A1 | 11/2014 | Ihlenburg |
| 2014/0354878 A1 | 12/2014 | Winter |
| 2014/0373345 A1 | 12/2014 | Steigerwald et al. |
| 2015/0222795 A1 | 8/2015 | Sauer et al. |

\* cited by examiner

METHOD OF MANUFACTURING VEHICULAR CAMERA WITH FLEXIBLE CONNECTORS

CROSS REFERENCE TO RELATED APPLICATIONS

The present application is a continuation of U.S. patent application Ser. No. 14/992,254, filed Jan. 11, 2016, now U.S. Pat. No. 9,868,404, which is a continuation of U.S. patent application Ser. No. 14/001,272, filed Aug. 23, 2013, now U.S. Pat. No. 9,233,641, which is a 371 national phase filing of PCT Application No. PCT/US2012/026073, filed Feb. 22, 2012, which claims the filing benefit of U.S. provisional applications, Ser. No. 61/593,962, filed Feb. 2, 2012, and Ser. No. 61/446,975, filed Feb. 25, 2011, which are hereby incorporated herein by reference in their entireties.

FIELD OF THE INVENTION

The present invention relates to cameras for use in vehicles, and more particularly to rearview cameras.

BACKGROUND OF THE INVENTION

A typical camera for mounting on a vehicle has a lens member, an imaging element, a circuit board and housing members that connect together. In particular, for certain applications, such as for some applications wherein the camera is rearwardly facing and is mounted in a rear panel on a vehicle, there can be relatively severe space restrictions for the camera. However, other vehicular camera applications also impose space restrictions on the camera. Additionally, some cameras are relatively complex assemblies that are expensive, and can suffer from reliability problems due to the number of components and the number of individual electrical connections that are associated therewith. In particular, some cameras have a front housing which holds a circuit board and a rear housing which mounts in a tight alignment with the front housing member and which houses electrical connectors (i.e. pins). At the distal end of the rear housing member are the terminals of the pins, which connect via a cable assembly to another component in the vehicle. At the front end of the rear housing member, a jumper is typically used to connect the front ends of the pins to the circuit board. This solution is used because it accommodates variation in the positions of the pins in the rear housing member and in the positions of the points on the circuit board intended to connect to the pins.

It would be advantageous to provide a camera that addresses one or more of these considerations.

SUMMARY OF THE INVENTION

The present invention provides a camera for mounting at a vehicle that includes aligned front and rear portions of a housing and provides direct electrical connection of electrical connectors or terminals at the front and rear portions of the housing.

According to a first aspect of the present invention, a camera for mounting on a vehicle includes a front housing member that holds a lens member, an imaging element and a circuit board with a set of front electrical connectors thereon, and a rear housing member that holds a set of rear electrical connectors that are directly mounted to the front electrical connectors (i.e. without the use of a jumper). The rear housing member is aligned to the front housing member with respect to a first axis. The front and rear electrical connectors are able to accommodate misalignment along two axes which are orthogonal to the each other and to the first axis.

By directly mounting the front and rear electrical connectors, a jumper wire is not needed, thereby reducing cost and eliminating potential sources of circuit failures that are associated with the use of jumper wires. By aligning the front and rear housing members, the overall space occupied by the camera is smaller, which is advantageous particularly when the camera is to be used in tight spaces.

In one embodiment, the camera includes a front camera housing member, a lens member mounted to the front housing member, an imager that is positioned to receive images through the lens member, a circuit board mounted to the front housing member, and a rear camera housing member. The circuit board comprises circuitry that is configured or operable to receive signals from the imager and to send signals to another component. The circuit board has a plurality of front electrical connectors thereon. The rear camera housing member has a rear housing alignment structure that mates with a front housing alignment structure to align the rear camera housing member with respect to the front camera housing member along a first axis. The rear camera housing member has a plurality of rear electrical connectors extending therefrom. The rear electrical connectors are electrically connected to the front electrical connector. One set of the sets of front and rear electrical connectors is a set of male electrical connectors and the other set of the sets of front and rear electrical connectors is a set of female electrical connectors. Each female electrical connector has a jaw structure including first and second jaws. The first and second jaws together define a second axis along which the first and second jaws clamp one of the male electrical connectors. The second axis is generally perpendicular to the first axis. The first and second jaws have a width that is sized so that the male electrical connector is positionable therebetween over a range of positions along the second axis. The female electrical connector has a jaw structure biasing member that biases the jaw structure towards a home position but permits movement of the jaw structure along a third axis that is generally perpendicular to the first and second axes.

These and other objects, advantages, purposes and features of the present invention will become apparent upon review of the following specification in conjunction with the drawings.

BRIEF DESCRIPTION OF THE DRAWINGS

The present invention will now be described by way of example only with reference to the attached drawings, in which.

DETAILED DESCRIPTION OF THE INVENTION

Figure 1:
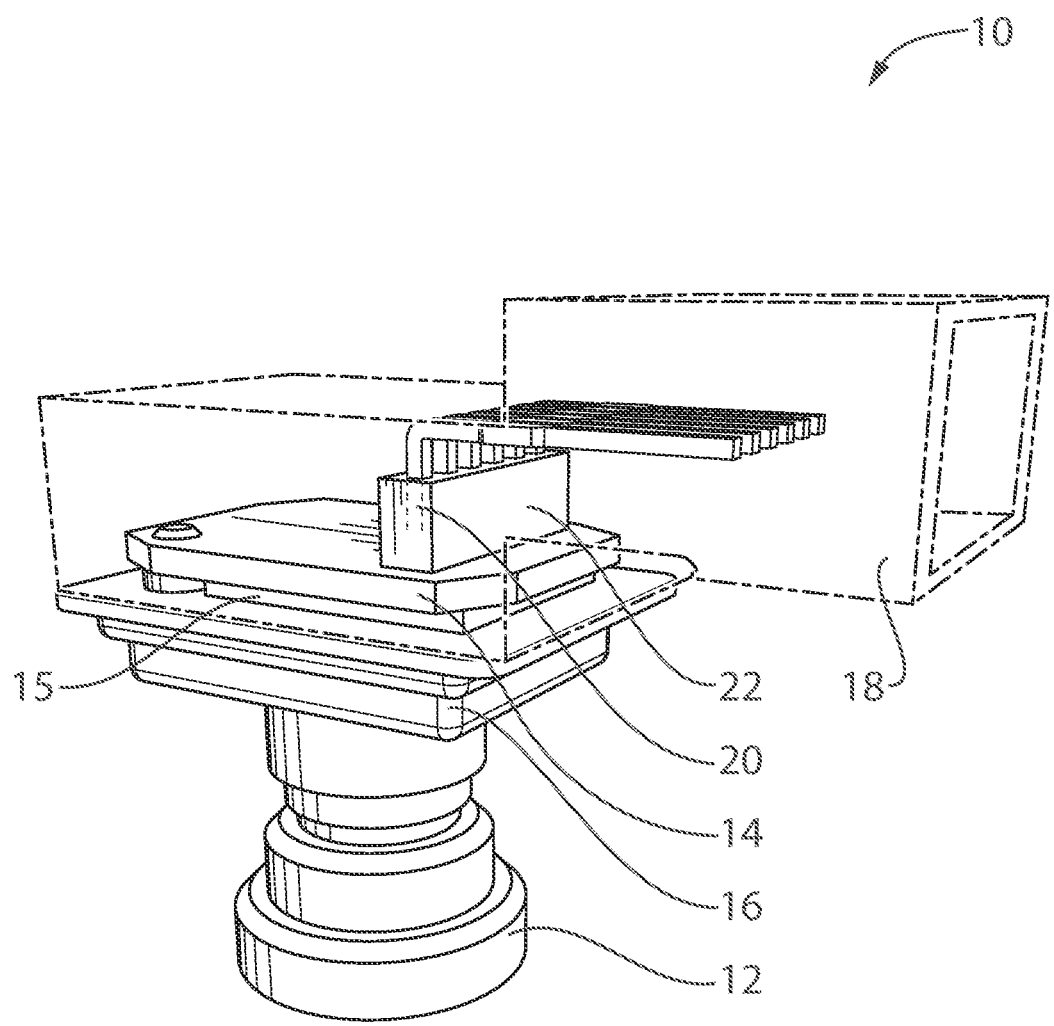
FIG. 1 is a perspective view of a camera in accordance with an embodiment of the present invention.

Reference is made to FIG. 1, which shows a camera 10 for use in a vehicle (not shown), and in particular for use as a rearview camera in a vehicle. The camera 10 includes an optical element or lens assembly or lens member 12, a circuit board 14, an imager 15, a front housing member 16 and a rear housing member 18 (shown in FIG. 1 as being transparent). The lens member 12 may be any suitable lens member known in the art, and is mounted to the front housing member 16. In some instances the lens member 12 may a separate element from the front housing member 16, or it may be integral with the front housing member 16.

Note that the terms 'front' and 'rear' as used in the present document refer to the front of the camera 10 (i.e., the portion of the camera where the lens member is located), and the rear of the camera 10 (i.e., the portion of the camera 10 opposite the front of the camera 10). When the camera 10 is used in a rearview application in a vehicle (such as when the camera is mounted at a rear portion of a vehicle and has a rearward field of view rearward of the vehicle), the front of the camera 10 thus faces rearwardly relative to the vehicle and the rear of the camera 10 faces towards the front of the vehicle.

The lens member 12 is positioned in a selected position to receive images and focus them on the imager 15. The imager 15 may be any suitable imaging element, such as an imaging array of photosensors or such as a charge-coupled device (CCD) or a complementary metal-oxide semiconductor (CMOS) sensor, such as discussed below. The circuit board 14 receives signals from the imager 15 and sends signals to one or more other components of the vehicle, such as a control device (not shown) within the vehicle. The imaging element 15 may be mounted directly onto the circuit board 14. The circuit board 14 is mounted to the front housing member 16.

Figure 2:
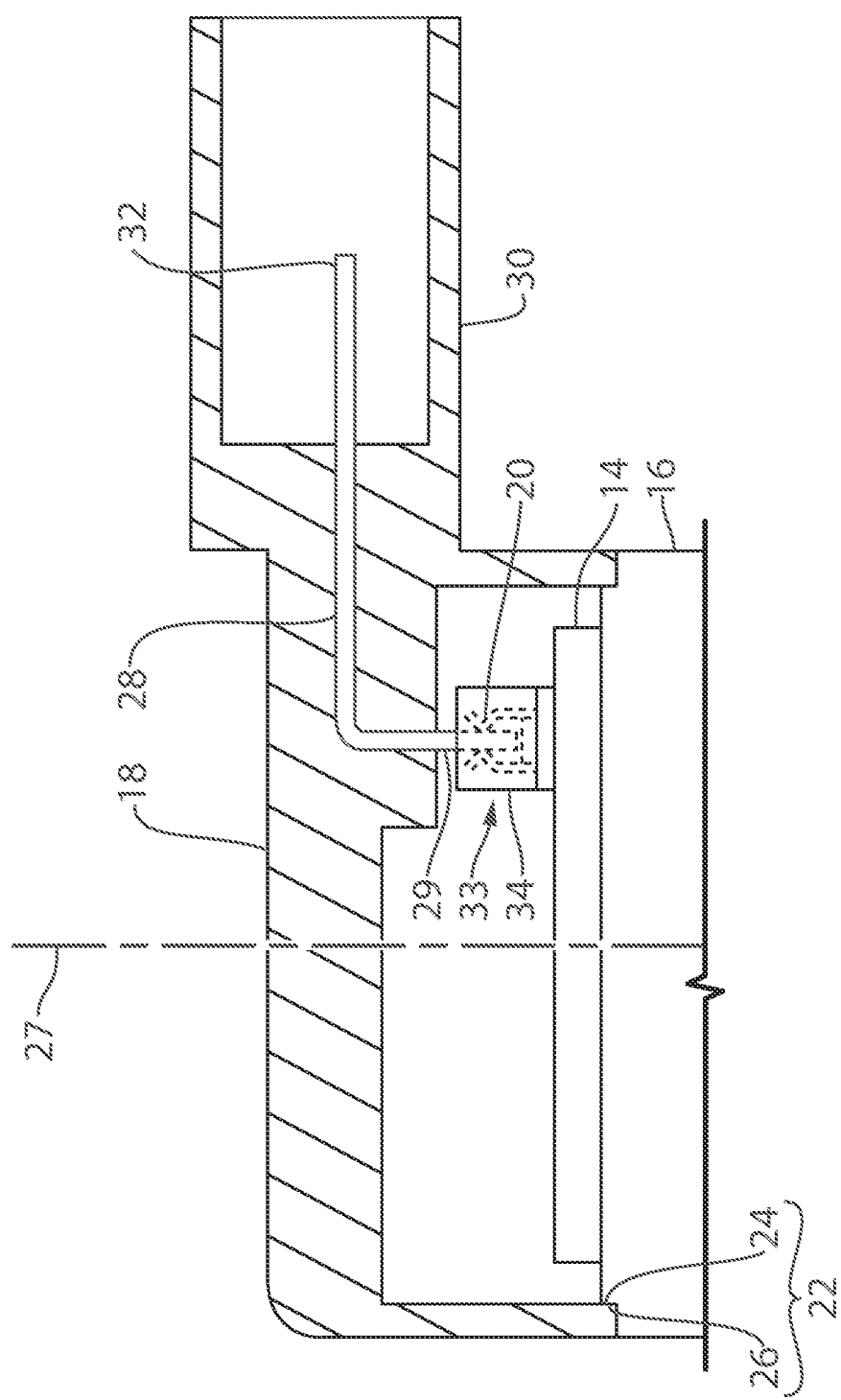
FIG. 2 is a sectional view of a portion of the camera shown in FIG. 1.

Referring to FIG. 2, the rear housing member 18 mounts to the front housing member 16 in a fixed position by virtue of an alignment structure 22, which aligns the rear housing member 18 in a specific position relative to the front housing member 16. The alignment structure 22 may be made up of any suitable rear housing alignment structure and any suitable front housing alignment structure which mate together to align the rear housing portion 18 with respect to the front housing member 16 along a first axis 27. For example, the alignment structure 22 may include a peripheral edge portion 24 on the rear housing member 18 that mates with a press fit onto a peripheral shoulder 26 on the front housing member 16. In an alternative embodiment, the alignment structure 22 may include a plurality of threaded fasteners (not shown), which pass through fastener apertures (not shown) on one of the housing members 16 or 18 and into threaded apertures (not shown) in the other of the housing members 16 or 18. An adhesive or some other means of joining or permanently joining the front and rear housing members 16 and 18 together may also be provided. For example, the housing members 16 and 18 may be welded together or otherwise bonded or joined.

The front and rear housing members 16 and 18 may be made from any suitable material, such as a polymeric material, such as a material called Xenoy™ from Sabic Americas, Inc. in Houston, Tex., USA. Alternatively to Xenoy™, any other type of PBT (Polybutylene Terephthalate) or PBT/PC (a blend of Polybutylene Terephthalate and Polycarbonate) or other suitable material may be used. In instances wherein the front and rear housing members 16 and 18 may build up a static electrical charge, it is preferable to provide means to inhibit such a buildup so as to protect components such as the circuit board 14.

A set of front electrical connectors 20 are connected to the circuit board 14, which are female electrical connectors. The rear housing member 18 has a set of rear electrical connectors 28 therein which, in the illustrated embodiment, are male electrical connectors. The rear electrical connectors 28 may be incorporated into the rear housing member 18 by any suitable means, such as by insert molding. The male electrical connectors 28 have first terminals 29 that mate with the female electrical connectors 20 on the circuit board 14, and second terminals 32, which are contained in a vehicle connection portion 30 of the rear housing member 18. The vehicle connection portion 30 is configured to connect to or receive a vehicle connector (such as a connector of a vehicle wiring harness or the like), which connects the circuit board 14 to some other component in the vehicle such as a control unit (not shown). The vehicle connection portion 30 need not be as shown. For example, the vehicle connection portion 30 may instead include a wire harness connected to the male electrical connectors 28, and a housing with pins therein connected to a distal end of the wire harness.

Figure 3:
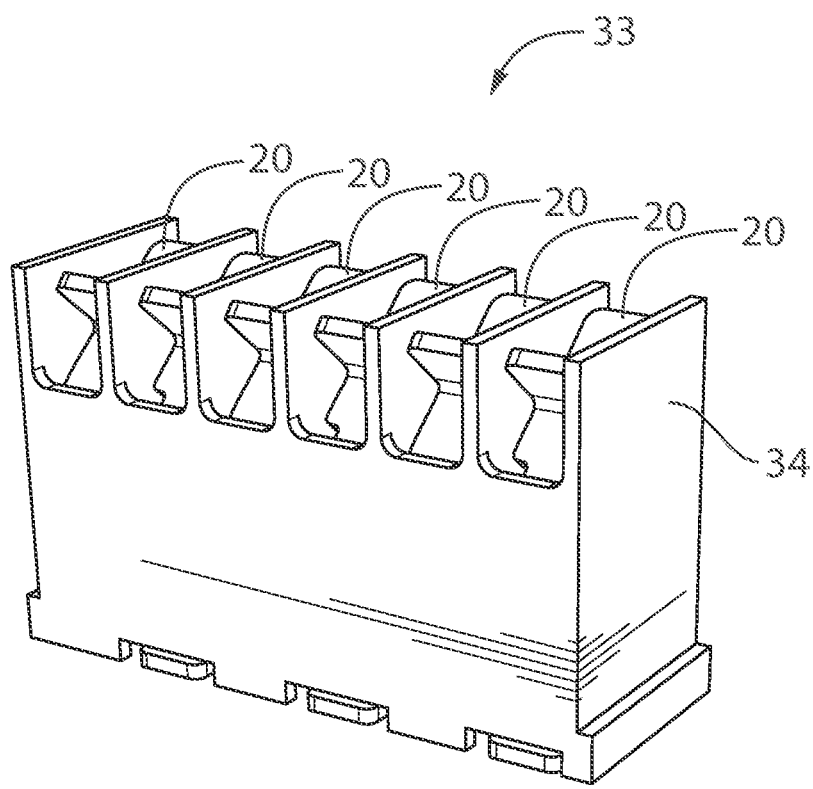
FIG. 3 is a magnified perspective view of a female electrical connector assembly from the camera shown in FIG. 1.
Figure 4:
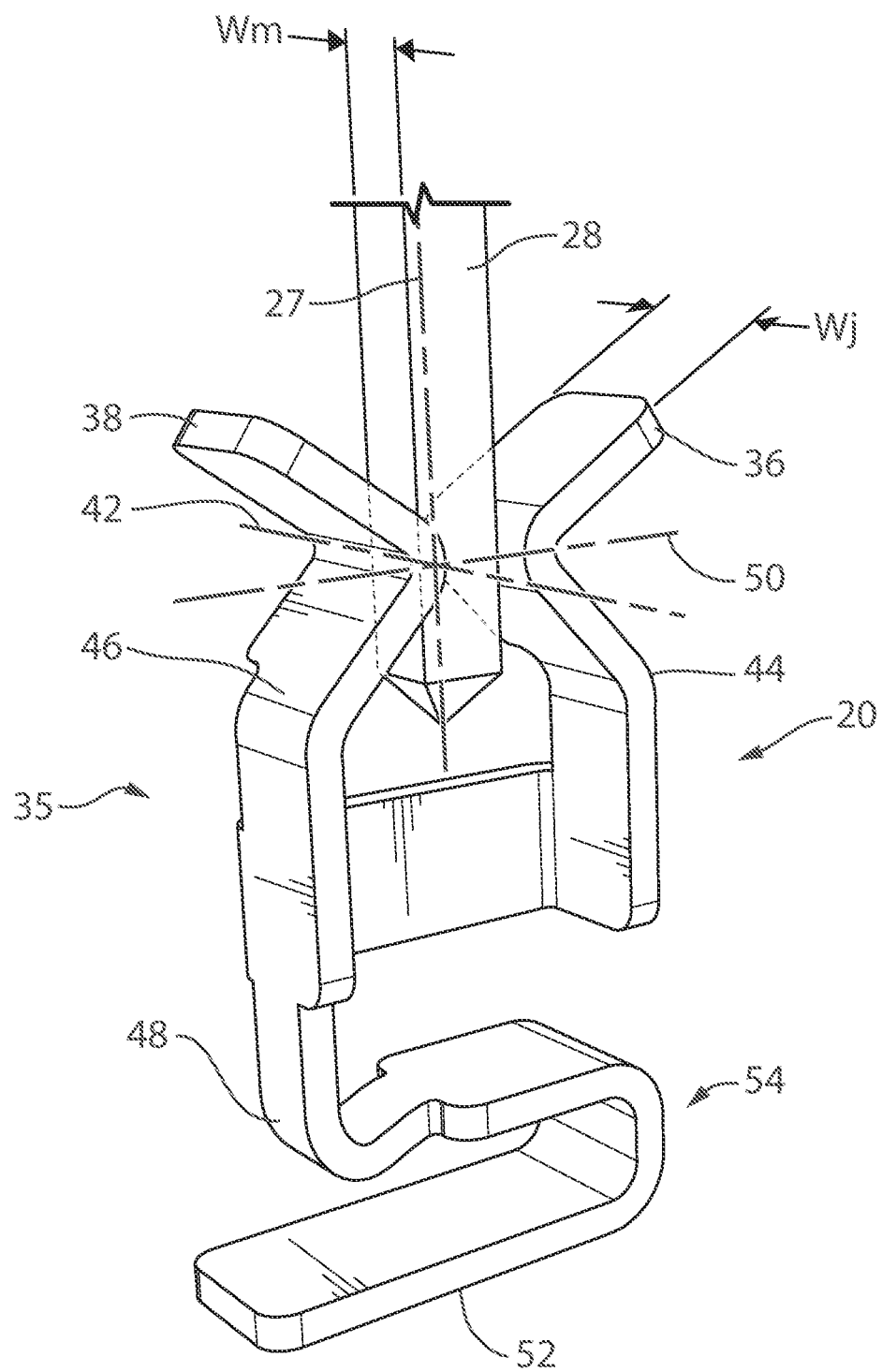
FIG. 4 is a magnified perspective side view of a female electrical connector from the female electrical connector assembly shown in FIG. 3.

Reference is made to FIG. 3, which shows a female electrical connector assembly 33, which the female electrical connectors are a part of. The female electrical connector assembly 33 includes a plurality of the female electrical connectors 20 and a connector housing 34. Referring to FIG. 4, each female electrical connector 20 has a jaw structure 35 including first and second jaws 36 and 38. The first and second jaws 36 and 38 are biased towards each other so that they clamp the male electrical connector 28 therebetween. The first and second jaws 36 and 38 together define a clamping line 42 may be referred to as a second axis along which they clamp the male electrical connector 28. The jaws 36 and 38 have a width Wj that is larger than the width (shown at Wm in FIG. 4) of the male electrical connector 28 so that the male electrical connector 28 is positionable between the jaws 36 and 38 over a range of positions along the second axis 42. The jaws 36 and 38 are biased towards each other by jaw biasing members 44 and 46, which may be any suitable biasing members such as leaf springs. The jaw structure 35 is biased towards a home position by a jaw structure biasing member 48, to which the jaw structure 35 is connected. The jaw structure biasing member 48 may be any suitable biasing member such as a leaf spring and permits movement of the jaw structure 35 along a third axis 50 (see FIG. 5) that is generally perpendicular to the first and second axes 27 and 42. As a result, the male electrical connector 28 can be received in the jaws 36 and 38 of the female electrical connector 20 over a range of positions along the third axis 50.

Figure 6:
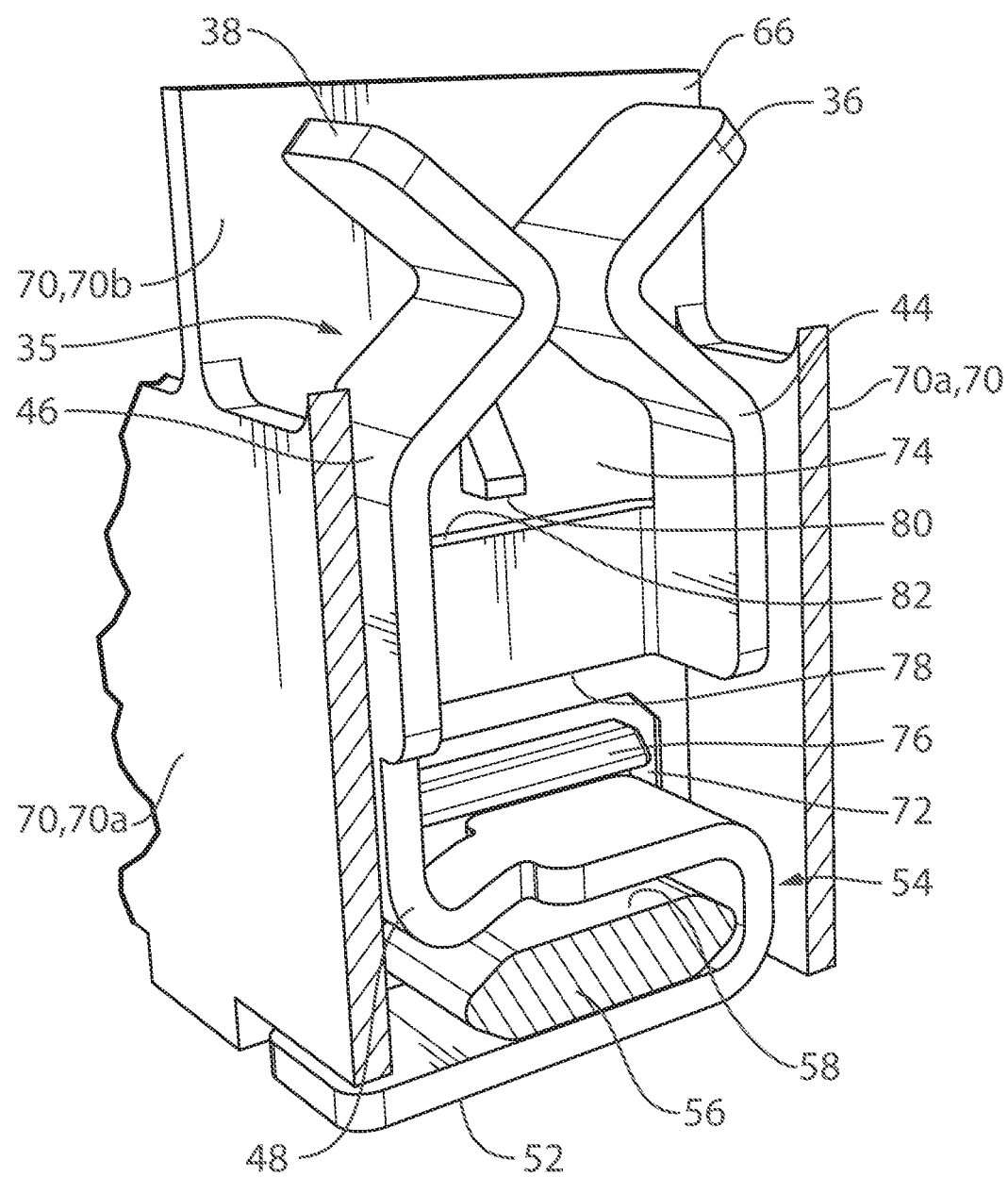
FIG. 6 is a magnified sectional perspective view of the female electrical connector assembly shown in FIG. 3.

The female electrical connector 20 further includes a contact 52 that is positioned for connecting to the circuit board 14. The contact 52 has a suitable surface area over which to connect to an electrical trace on the circuit board 14. The female electrical connector 20 further includes a clamp portion 54, which is sized to clamp onto a base member 56 (FIGS. 6 and 7) that forms part of the connector housing 34. The contact 52 forms part of the clamp portion 54.

The female electrical connector 20 is preferably formed from a single piece of material that is cut and bent as necessary. The connector 20 may be made from any suitable material, such as a copper alloy or the like. An example material is tin-plated C15219 phosphor bronze, but other materials may be used.

Figure 7:
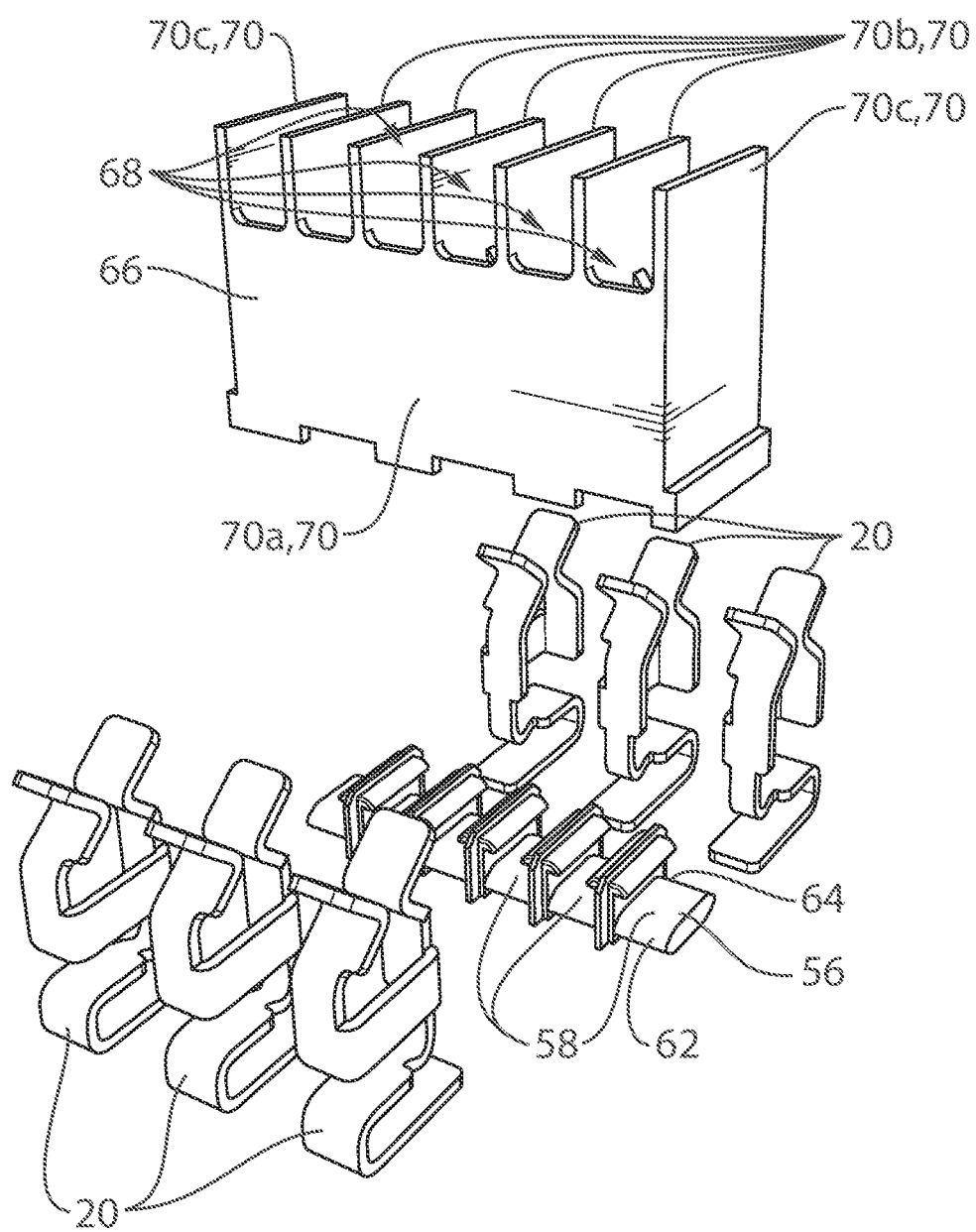
FIG. 7 is an exploded view of the female electrical connector assembly shown in FIG. 3.
Figure 8A:
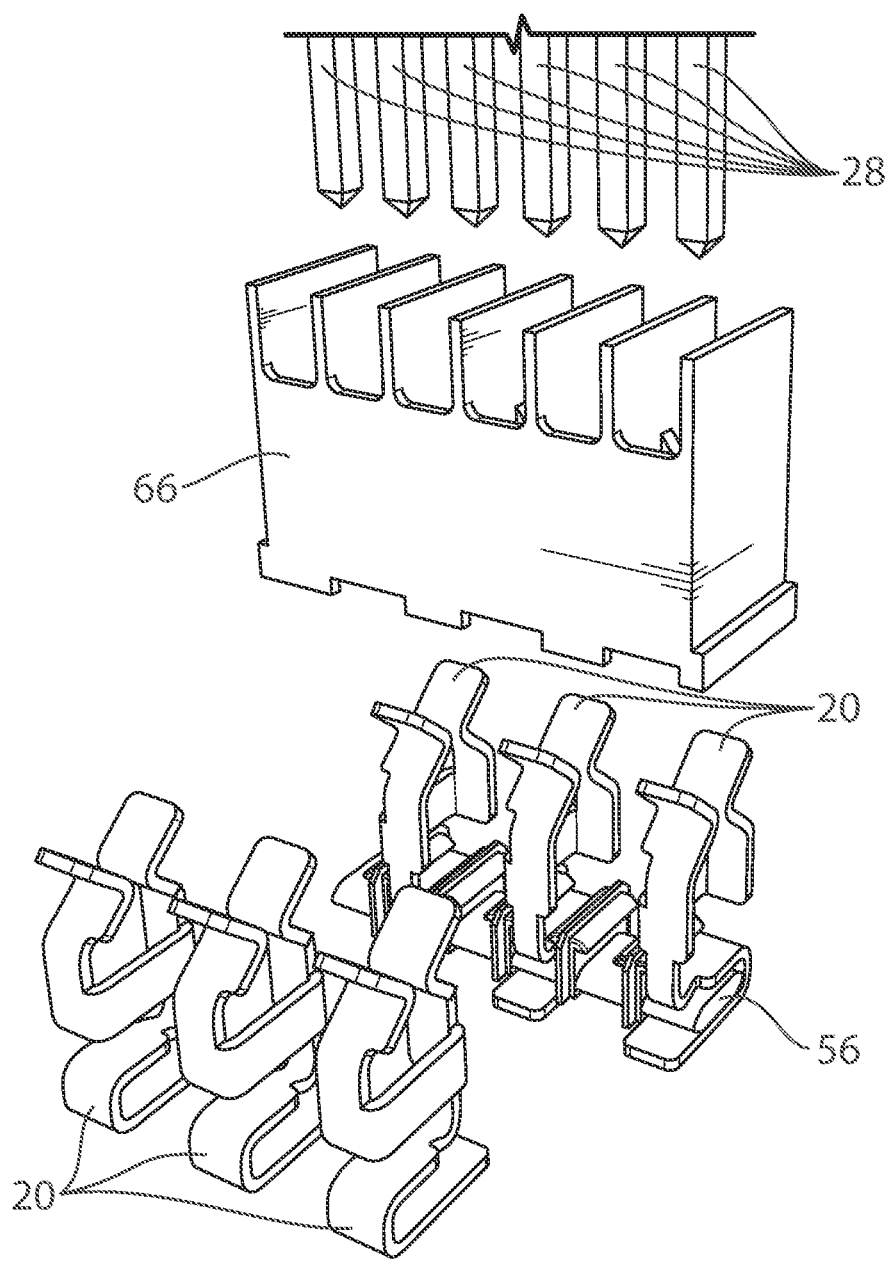
FIGS. 8a and 8b are perspective views illustrating stages of assembly of the female electrical connector assembly shown in FIG. 3.
Figure 8B:
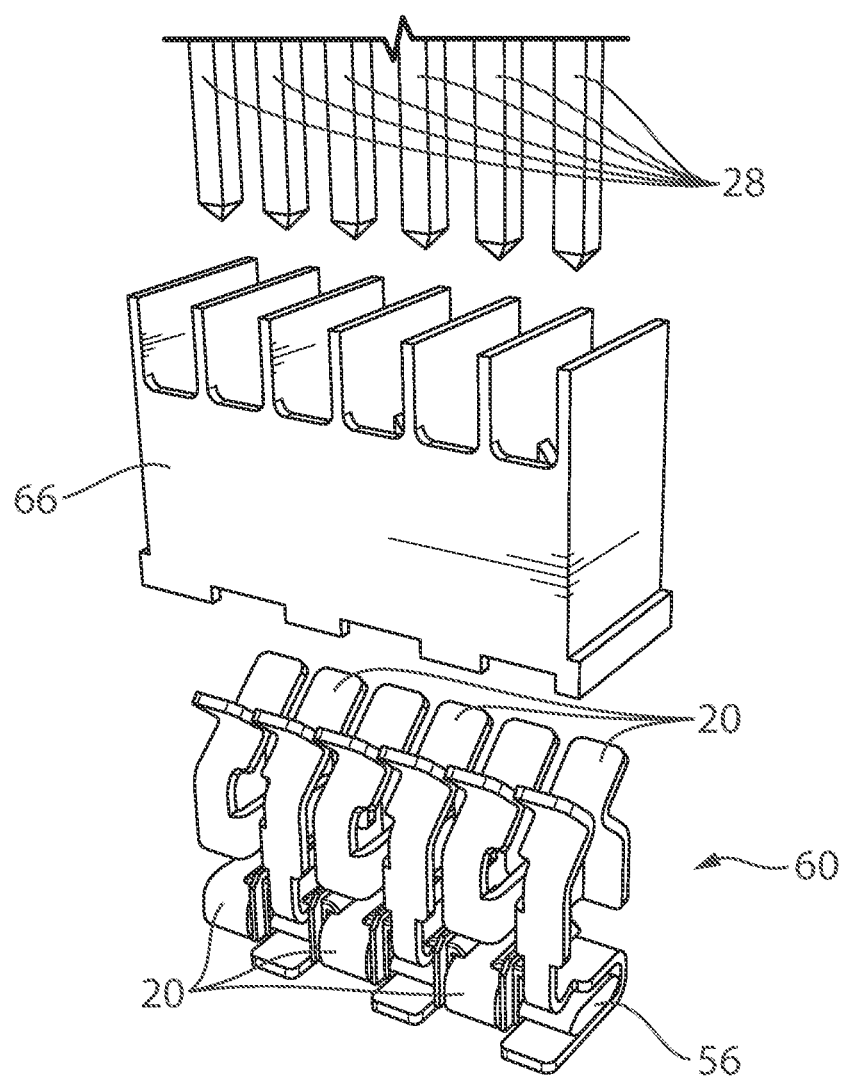

Referring to FIG. 7, the base member 56 includes a plurality of clamp receiving portions 58 which are sized to snugly receive the clamp portions 54 of the female electrical connectors 20, thereby forming a pre-assembly 60 (FIG. 8b) that is self-supporting and that can be handled as a single item so as to facilitate assembly of the camera 10. As shown in FIG. 8a, the base member 56 may be configured such that successive female electrical connectors 20 alternately connect to the base member 56 from one side shown at 62 and then from the other side shown at 64, which facilitates placement of the female electrical connectors 20 onto the base member 56.

Figure 5:
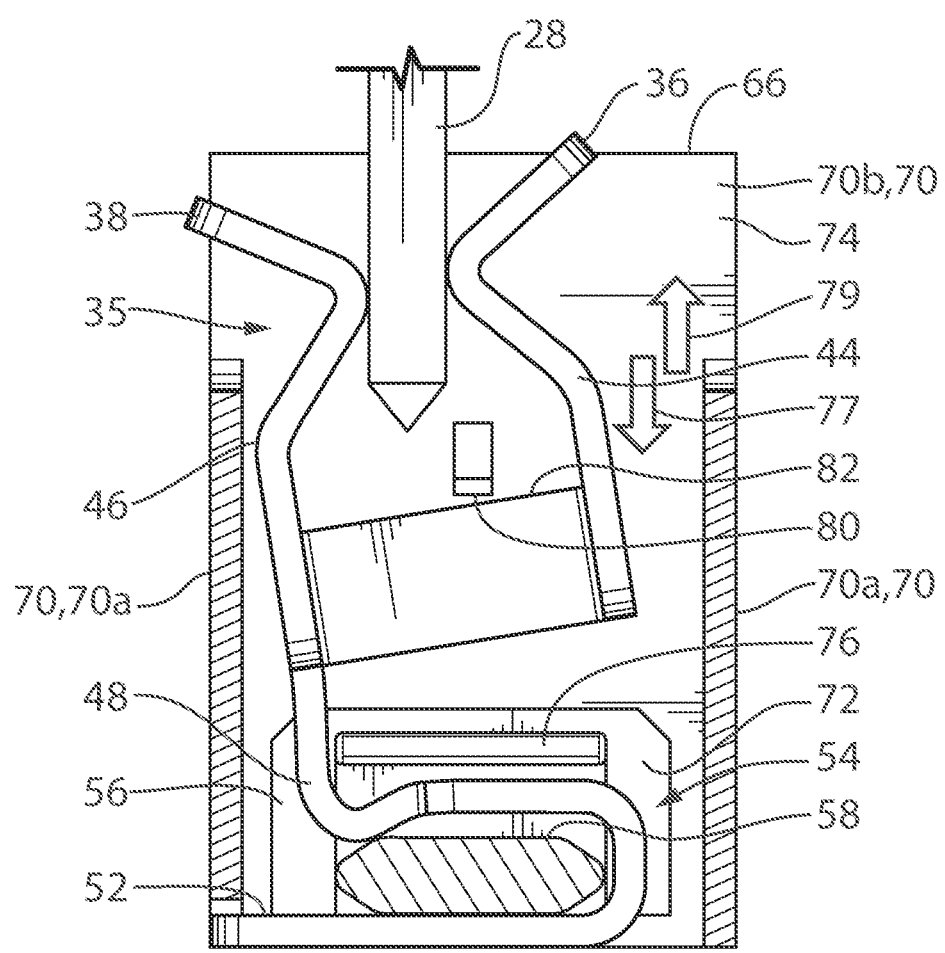
FIG. 5 is a magnified sectional end view of the female electrical connector assembly shown in FIG. 3.

The connector housing 34 further includes an upper member 66, which cooperates with the base member 56 to form chambers 68, each of which houses one of the female electrical connectors 20 (shown in FIGS. 7 and 3). The chambers 68 are defined by chamber walls 70, which include fore and aft walls 70a, divider walls 70b and end walls 70c. Referring to FIG. 5, one of the chambers 68 is shown. As shown, the fore and aft walls 70a serve to limit the movement of the jaw structure 35 along the third axis 50.

The upper member 66 cooperates with the base member 56 to form the divider walls 70b. More particularly, the divider walls 70b have lower portions 72 which are portions of the base member 56 and upper portions 74 which are portions of the upper member 66.

During entry of the male electrical connector 28 into the female electrical connector 20 the male electrical connector 28 will drive the jaw structure 35 of the female electrical connector 20 in a first direction shown by arrow 77 (i.e. downwards in FIG. 5). An entry limit member 76 is provided on one of the chamber walls 70 (e.g., the lower portion 72 of the divider wall 70b), which is engaged by an entry limit shoulder 78 on the female electrical connector 20 to limit the amount of downward movement that the jaw structure 35 will incur during entry of the male electrical connector 28.

During withdrawal of the male electrical connector 28 from the female electrical connector 20, the male electrical connector 28 will pull the jaw structure 35 of the female electrical connector 20 in a second direction 79 (i.e., upwards in FIG. 5) so as to withdraw it from the chamber 68. A withdrawal limit member 80 is provided on one of the chamber walls 70 (e.g., the upper portion 74 of the divider wall 70b), which is engaged by a withdrawal limit shoulder 82 on the female electrical connector 20 to limit the amount of upward movement that the jaw structure 35 will incur during withdrawal of the male electrical connector 28.

The connector housing 34 may be made from any suitable material, such as an electrically insulative material so as to limit or prevent conduction of electrical signals between adjacent female electrical connectors 20. An example material is Nylon 9T, but other suitable materials may be used.

The upper member 66 may connect to the base member 56 fixedly, such as by way of a suitable adhesive. As an alternative to adhesive, a mechanical means may be used, such as snap features, or interference ribs that would provide a force fit. Alternatively, the upper member 66 may connect to the circuit board 14 using some suitable means such as an adhesive and may engage the base member 56 without being connected to the base member 56.

As a result of the configuration of the female electrical connectors 20, the male electrical connectors 28 and the female electrical connectors 20 need not be precisely aligned with respect to either of the second or third axes in order for them to mate together to form a strong electrical connection without causing undue stresses on each other. As a result, the rear housing member 18 can be aligned with the front housing member 16 without damaging the connectors 20 and 28 and while providing a strong electrical connection therebetween. By aligning the front and rear housing members 16 and 18 together, greater control over the overall dimensions of the camera 10 are provided, as compared to an assembly where the rear housing 'floats' relative to the front housing member. As a result, the camera 10 can fit in a smaller space than a similar camera 10 with a floating rear housing member, which is advantageous in today's vehicles where there is a continuing need to fit such cameras in ever shrinking spaces. Further, the non-floating rear housing member 18 may be used as a datum feature during installation of the camera to maintain tight tolerances relative to a camera with a floating rear housing member.

The camera 10 need not be mounted at the rear of a vehicle or as a rearview camera at all. The camera may be mounted anywhere suitable about the vehicle. For example, the camera could face the front or side of the vehicle, or may, for example, face the rear of the vehicle while being mounted on the side of the vehicle (e.g., such as for blind-spot monitoring for the vehicle or the like).

In the illustrated embodiment, the front electrical connectors 20 are female electrical connectors and the rear electrical connectors 28 are male electrical connectors. It is alternatively possible to provide the male electrical connectors on the circuit board 14 as the front electrical connectors and the female electrical connectors as the rear electrical connectors.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional application Ser. No. 61/563,965, filed Nov. 28, 2011, which is hereby incorporated herein by reference in its entirety.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570, 017, filed Dec. 13, 2011; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/559,970, filed Nov. 15, 2011; Ser. No. 61/552,167, filed Oct. 27, 2011; Ser. No. 61/540,256, filed Sep. 28, 2011; Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010 and published Dec. 16, 2010 as International Publication No. WO 2010/144900, and/or U.S. patent application Ser. No. 13/202,005, filed Aug. 17, 2011, now U.S. Pat. No. 9,126,525, which are hereby incorporated herein by reference in their entireties.

The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,965,336; 7,004,606 and/or 7,720,580, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170; and/or U.S. provisional applications, Ser. No. 61/511,738, filed Jul. 26, 2011; and/or Ser. No. 61/503,098, filed Jun. 30, 2011, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/618,686, filed Oct. 14, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). Optionally, the vision system (utilizing the rearward facing camera and other cameras disposed at the vehicle with exterior fields of view) may the camera or cameras may be part of a vehicle vision system and the vision system may comprise or utilize a plurality of cameras, and the vision system (utilizing a rearward facing camera and sidewardly facing cameras and a forwardly facing cameras disposed at the vehicle) may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or U.S. patent application Ser. No. 13/333,337, filed Dec. 21, 2011 and published Jun. 28, 2012 as U.S. Publication No. US-2012-0162427, and/or U.S. provisional applications, Ser. No. 61/570,017, filed Dec. 13, 2011; Ser. No. 61/559,970, filed Nov. 15, 2011; and/or Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 7,855,755; 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A method of assembling a camera for mounting at a vehicle for a vehicle vision system, said method comprising:
   providing a front housing having a lens, an imaging element and a circuit board;
   providing a rear housing;
   providing a set of first electrical connectors at the circuit board;
   providing a set of second electrical connectors at the rear housing, wherein the set of second electrical connectors is configured to electrically connect to an electrical connector of a vehicle wire harness when the assembled camera is mounted at the vehicle;
   wherein one of the sets of first and second electrical connectors comprises a set of male connectors and the other of the sets of first and second electrical connectors comprises a set of female connectors;
   providing a connector housing at the female connectors, wherein the connector housing includes a plurality of chambers, and wherein each chamber holds a respective one of the female connectors, and wherein each chamber is defined by a chamber wall that separates the respective chamber from the other chambers;
   mating the rear housing with the front housing to encase the imaging element and the circuit board;
   when mating the rear housing with the front housing, inserting the male connectors into respective female connectors and clamping the male connectors therein via jaw structure of the respective female connectors to electrically conductively connect the first and second electrical connectors;
   when inserting the male connectors into the respective female connectors, the female connectors flex to accommodate misalignment of the male and female connectors;
   wherein inserting the male connectors into the respective female connectors comprises inserting the male connectors until a stop element at at least one respective female connector limits movement of the male connector or the female connector;
   wherein mating the rear housing with the front housing comprises moving one of the rear housing and the front housing in a first direction along a first axis; and wherein, when inserting the male connectors into the respective female connectors, the female connectors flex in a second direction transverse to the first axis to accommodate misalignment of the male and female connectors.

2. A method of assembling a camera for mounting at a vehicle for a vehicle vision system, said method comprising:
providing a front housing having a lens, an imaging element and a circuit board;
providing a rear housing;
providing a set of first electrical connectors at the circuit board;
providing a set of second electrical connectors at the rear housing, wherein the set of second electrical connectors is configured to electrically connect to an electrical connector of a vehicle wire harness when the assembled camera is mounted at the vehicle;
wherein one of the sets of first and second electrical connectors comprises a set of male connectors and the other of the sets of first and second electrical connectors comprises a set of female connectors;
providing a connector housing at the female connectors, wherein the connector housing includes a plurality of chambers, and wherein each chamber holds a respective one of the female connectors, and wherein each chamber is defined by a chamber wall that separates the respective chamber from the other chambers;
mating the rear housing with the front housing to encase the imaging element and the circuit board;
when mating the rear housing with the front housing, inserting the male connectors into respective female connectors and clamping the male connectors therein via jaw structure of the respective female connectors to electrically conductively connect the first and second electrical connectors;
when inserting the male connectors into the respective female connectors, the female connectors flex to accommodate misalignment of the male and female connectors;
wherein inserting the male connectors into the respective female connectors comprises inserting the male connectors until a stop element at at least one respective female connector limits movement of the male connector or the female connector;
wherein mating the rear housing with the front housing comprises moving one of the rear housing and the front housing in a first direction along a first axis; and
wherein the male and female connectors are configured to accommodate misalignment along two axes that are orthogonal to each other and to the first axis.

3. The method of claim 2, wherein the stop element at the at least one respective female connector is part of the connector housing.

4. The method of claim 2, wherein providing the connector housing at the female connectors comprises forming a female connector assembly that is provided as a unit at the circuit board or at the rear housing.

5. The method of claim 2, comprising, when mating the rear housing with the front housing, mating rear housing alignment structure of the rear housing with front housing alignment structure of the front housing to align the rear housing with respect to the front housing.

6. The method of claim 2, wherein the first electrical connectors comprise the female connectors and the second electrical connectors comprise the male connectors.

7. The method of claim 2, wherein the first electrical connectors comprise the male connectors and the second electrical connectors comprise the female connectors.

8. A method of assembling a camera for mounting at a vehicle for a vehicle vision system, said method comprising:
providing a front housing having a lens, an imaging element and a circuit board;
providing a rear housing;
providing a set of first electrical connectors at the circuit board;
providing a set of second electrical connectors at the rear housing, wherein the set of second electrical connectors is configured to electrically connect to an electrical connector of a vehicle wire harness when the assembled camera is mounted at the vehicle;
wherein one of the sets of first and second electrical connectors comprises a set of male connectors and the other of the sets of first and second electrical connectors comprises a set of female connectors;
providing a connector housing at the female connectors, wherein the connector housing includes a plurality of chambers, and wherein each chamber holds a respective one of the female connectors, and wherein each chamber is defined by a chamber wall that separates the respective chamber from the other chambers;
mating the rear housing with the front housing to encase the imaging element and the circuit board;
when mating the rear housing with the front housing, inserting the male connectors into respective female connectors and clamping the male connectors therein via jaw structure of the respective female connectors to electrically conductively connect the first and second electrical connectors;
when inserting the male connectors into the respective female connectors, the female connectors flex to accommodate misalignment of the male and female connectors;
wherein inserting the male connectors into the respective female connectors comprises inserting the male connectors until a stop element at at least one respective female connector limits movement of the male connector or the female connector;
wherein mating the rear housing with the front housing comprises moving one of the rear housing and the front housing in a first direction along a first axis; and
when mating of the front and rear housings, moving the male connectors in the first direction to enter the female connectors, wherein the stop element at the at least one respective female connector is positioned to limit movement of the female connectors in the first direction during entry of the male connectors into the female connectors.

9. A method of assembling a camera for mounting at a vehicle for a vehicle vision system, said method comprising:
providing a front housing having a lens, an imaging element and a circuit board;
providing a rear housing;
providing a set of first electrical connectors at the circuit board;
providing a set of second electrical connectors at the rear housing, wherein the set of second electrical connectors is configured to electrically connect to an electrical connector of a vehicle wire harness when the assembled camera is mounted at the vehicle;
wherein one of the sets of first and second electrical connectors comprises a set of male connectors and the other of the sets of first and second electrical connectors comprises a set of female connectors;
providing a connector housing at the female connectors, wherein the connector housing includes a plurality of chambers, and wherein each chamber holds a respective one of the female connectors, and wherein each chamber is defined by a chamber wall that separates the respective chamber from the other chambers;
mating the rear housing with the front housing to encase the imaging element and the circuit board;
when mating the rear housing with the front housing, inserting the male connectors into respective female connectors and clamping the male connectors therein via jaw structure of the respective female connectors to electrically conductively connect the first and second electrical connectors;
when inserting the male connectors into the respective female connectors, the female connectors flex to accommodate misalignment of the male and female connectors;
wherein inserting the male connectors into the respective female connectors comprises inserting the male connectors until a stop element at at least one respective female connector limits movement of the male connector or the female connector; and
providing retraction stop elements that limit movement of the female connectors when the male connectors are retracted from the female connectors.

10. The method of claim 9, wherein the retraction stop elements are part of the connector housing.

11. The method of claim 9, wherein mating the rear housing with the front housing comprises moving one of the rear housing and the front housing in a first direction along a first axis.

12. A method of assembling a camera for mounting at a vehicle for a vehicle vision system, said method comprising:
providing a front housing having a lens, an imaging element and a circuit board;
providing a rear housing;
providing a set of first electrical connectors at the circuit board;
providing a set of second electrical connectors at the rear housing, wherein the set of second electrical connectors is configured to electrically connect to an electrical connector of a vehicle wire harness when the assembled camera is mounted at the vehicle;
wherein one of the sets of first and second electrical connectors comprises a set of male connectors and the other of the sets of first and second electrical connectors comprises a set of female connectors;
providing a connector housing at the female connectors, wherein the connector housing includes a plurality of chambers, and wherein each chamber holds a respective one of the female connectors, and wherein each chamber is defined by a chamber wall that separates the respective chamber from the other chambers;
mating the rear housing with the front housing to encase the imaging element and the circuit board;
when mating the rear housing with the front housing, inserting the male connectors into respective female connectors and clamping the male connectors therein via jaw structure of the respective female connectors to electrically conductively connect the first and second electrical connectors;
when inserting the male connectors into the respective female connectors, the female connectors flex to accommodate misalignment of the male and female connectors;
wherein inserting the male connectors into the respective female connectors comprises inserting the male connectors until a stop element at at least one respective female connector limits movement of the male connector or the female connector;
wherein providing the connector housing at the female connectors comprises forming a female connector assembly that is provided as a unit at the circuit board or at the rear housing; and
wherein the connector housing comprises base structure that snugly engages a base portion of each of the female connectors to retain the female connectors at the connector housing.

13. A method of assembling a camera for mounting at a vehicle for a vehicle vision system, said method comprising:
providing a front housing having a lens, an imaging element and a circuit board;
providing a rear housing;
providing a set of first electrical connectors at the circuit board;
providing a set of second electrical connectors at the rear housing, wherein the set of second electrical connectors is configured to electrically connect to an electrical connector of a vehicle wire harness when the assembled camera is mounted at the vehicle;
wherein one of the sets of first and second electrical connectors comprises a set of male connectors and the other of the sets of first and second electrical connectors comprises a set of female connectors;
providing a connector housing at the female connectors, wherein the connector housing includes a plurality of chambers, and wherein each chamber holds a respective one of the female connectors, and wherein each chamber is defined by a chamber wall that separates the respective chamber from the other chambers;
mating the rear housing with the front housing to encase the imaging element and the circuit board;
when mating the rear housing with the front housing, inserting the male connectors into respective female connectors and clamping the male connectors therein via jaw structure of the respective female connectors to electrically conductively connect the first and second electrical connectors;
when inserting the male connectors into the respective female connectors, the female connectors flex to accommodate misalignment of the male and female connectors;
wherein inserting the male connectors into the respective female connectors comprises inserting the male connectors until a stop element at at least one respective female connector limits movement of the male connector or the female connector; and
wherein the jaw structure of each female connector has a width that is sized so that a male connector is insertable therein over a range of positions.

14. A method of assembling a camera for mounting at a vehicle for a vehicle vision system, said method comprising:
providing a front housing having a lens, an imaging element and a circuit board;
providing a rear housing;
providing a set of first electrical connectors at the circuit board;

providing a set of second electrical connectors at the rear housing, wherein the set of second electrical connectors is configured to electrically connect to an electrical connector of a vehicle wire harness when the assembled camera is mounted at the vehicle;

wherein one of the sets of first and second electrical connectors comprises a set of male connectors and the other of the sets of first and second electrical connectors comprises a set of female connectors;

providing a connector housing at the female connectors, wherein the connector housing includes a plurality of chambers, and wherein each chamber holds a respective one of the female connectors, and wherein each chamber is defined by a chamber wall that separates the respective chamber from the other chambers;

mating the rear housing with the front housing to encase the imaging element and the circuit board;

when mating the rear housing with the front housing, inserting the male connectors into respective female connectors and clamping the male connectors therein via jaw structure of the respective female connectors to electrically conductively connect the first and second electrical connectors;

when inserting the male connectors into the respective female connectors, the female connectors flex to accommodate misalignment of the male and female connectors;

wherein inserting the male connectors into the respective female connectors comprises inserting the male connectors until a stop element at at least one respective female connector limits movement of the male connector or the female connector; and wherein the female connectors have biasing structure that bias the jaw structure towards a home position.

15. A method of assembling a camera for mounting at a vehicle for a vehicle vision system, said method comprising:
providing a front housing having a lens, an imaging element and a circuit board;
providing a rear housing;
providing a set of first electrical connectors at the circuit board;
providing a set of second electrical connectors at the rear housing, wherein the set of second electrical connectors is configured to electrically connect to an electrical connector of a vehicle wire harness when the assembled camera is mounted at the vehicle;
wherein one of the sets of first and second electrical connectors comprises a set of male connectors and the other of the sets of first and second electrical connectors comprises a set of female connectors;
providing a connector housing at the female connectors, wherein the connector housing includes a plurality of chambers, and wherein each chamber holds a respective one of the female connectors, and wherein each chamber is defined by a chamber wall that separates the respective chamber from the other chambers;
mating the rear housing with the front housing to encase the imaging element and the circuit board;
when mating the rear housing with the front housing, inserting the male connectors into respective female connectors and clamping the male connectors therein via jaw structure of the respective female connectors to electrically conductively connect the first and second electrical connectors;

when inserting the male connectors into the respective female connectors, the female connectors flex to accommodate misalignment of the male and female connectors;

wherein inserting the male connectors into the respective female connectors comprises inserting the male connectors until a stop element at at least one respective female connector limits movement of the male connector or the female connector; and wherein the female connectors include a flexible base portion, and wherein the connector housing comprises a flex-limiting structure that limits flexing of the flexible base portion when the male connectors are inserted into the female connectors.

16. A method of assembling a camera for mounting at a vehicle for a vehicle vision system, said method comprising:
providing a front housing having a lens, an imaging element and a circuit board;
providing a rear housing;
providing a set of first electrical connectors at the circuit board;
providing a set of second electrical connectors at the rear housing, wherein the set of second electrical connectors is configured to electrically connect to an electrical connector of a vehicle wire harness when the assembled camera is mounted at the vehicle;
wherein the set of first electrical connectors comprises a set of female connectors and the set of second electrical connectors comprises a set of male connectors;
providing a connector housing at the female connectors, wherein the connector housing includes a plurality of chambers, and wherein each chamber holds a respective one of the female connectors, and wherein each chamber is defined by a chamber wall that separates the respective chamber from the other chambers;
mating the rear housing with the front housing to encase the imaging element and the circuit board;
wherein mating the rear housing with the front housing comprises moving one of the rear housing and the front housing in a first direction along a first axis;
when mating the rear housing with the front housing, inserting the male connectors into respective female connectors and clamping the male connectors therein via jaw structure of the respective female connectors to electrically conductively connect the first and second electrical connectors;
wherein each female connector has a width along a second axis orthogonal to the first axis that is sized so that a male connector is insertable therein over a range of positions; and
when inserting the male connectors into the respective female connectors, the female connectors flex in a direction orthogonal to the first and second axes to accommodate misalignment of the male and female connectors.

17. The method of claim 16, comprising, when mating of the front and rear housings, moving the male connectors in the first direction to enter the female connectors, wherein stop elements are positioned to limit movement of the female connectors in the first direction during entry of the male connectors into the female connectors.

18. A method of assembling a camera for mounting at a vehicle for a vehicle vision system, said method comprising:
providing a front housing having a lens, an imaging element and a circuit board;
providing a rear housing;

providing a set of first electrical connectors at the circuit board;

providing a set of second electrical connectors at the rear housing, wherein the set of second electrical connectors is configured to electrically connect to an electrical connector of a vehicle wire harness when the assembled camera is mounted at the vehicle;

wherein one of the sets of first and second electrical connectors comprises a set of male connectors and the other of the sets of first and second electrical connectors comprises a set of female connectors;

providing a connector housing at the female connectors, wherein the connector housing includes a plurality of chambers, and wherein each chamber holds a respective one of the female connectors, and wherein each chamber is defined by a chamber wall that separates the respective chamber from the other chambers;

mating the rear housing with the front housing to encase the imaging element and the circuit board;

when mating the rear housing with the front housing, inserting the male connectors into respective female connectors and clamping the male connectors therein via jaw structure of the respective female connectors to electrically conductively connect the first and second electrical connectors;

when inserting the male connectors into the respective female connectors, the female connectors flex to accommodate misalignment of the male and female connectors;

wherein inserting the male connectors into the respective female connectors comprises inserting the male connectors until stop elements at respective female connectors limit flexing of the respective female connector;

wherein the stop elements are part of the connector housing;

when mating of the front and rear housings, moving the male connectors in a first direction to enter the female connectors, wherein the stop elements are positioned to limit flexing of the female connectors during entry of the male connectors into the female connectors;

providing retraction stop elements that limit movement of the female connectors when the male connectors are retracted from the female connectors; and wherein the retraction stop elements are part of the connector housing.

19. The method of claim 18, wherein providing the connector housing at the female connectors comprises forming a female connector assembly that is provided as a unit at the circuit board or at the rear housing, and wherein the connector housing comprises base structure that snugly engages a base portion of each of the female connectors to retain the female connectors at the connector housing.

\* \* \* \* \*